United States Patent
Thrall et al.

(10) Patent No.: US 7,337,398 B1
(45) Date of Patent: Feb. 26, 2008

(54) RECONSTITUTE TAG-DELIMITED TABLES IN A GRAPHICS EDITING APPLICATION

(75) Inventors: Michael Thrall, Plano, TX (US); Brian Edgin, Wylie, TX (US)

(73) Assignee: Adobe Systems Incorporated, San Jose, CA (US)

( * ) Notice: Subject to any disclaimer, the term of this patent is extended or adjusted under 35 U.S.C. 154(b) by 986 days.

(21) Appl. No.: 10/377,144

(22) Filed: Feb. 28, 2003

(51) Int. Cl.
*G06F 15/00* (2006.01)

(52) U.S. Cl. ...................... 715/526; 715/500

(58) Field of Classification Search ............... 715/509, 715/510, 530, 500, 526
See application file for complete search history.

(56) References Cited

U.S. PATENT DOCUMENTS

| | | | | |
|---|---|---|---|---|
| 6,085,202 A * | 7/2000 | Rao et al. | ............... | 715/509 |
| 6,112,216 A * | 8/2000 | Pratley et al. | ............... | 715/509 |
| 6,129,278 A * | 10/2000 | Wang et al. | ............... | 235/462.01 |
| 6,442,575 B2 * | 8/2002 | Pratley et al. | ............... | 715/503 |
| 6,544,294 B1 * | 4/2003 | Greenfield et al. | ............... | 715/526 |
| 6,678,865 B1 * | 1/2004 | Pratley et al. | ............... | 715/509 |
| 6,687,875 B1 * | 2/2004 | Suzuki | ............... | 715/503 |
| 6,697,825 B1 * | 2/2004 | Underwood et al. | ............... | 715/530 |
| 6,851,088 B1 * | 2/2005 | Conner et al. | ............... | 715/509 |
| 6,889,359 B1 * | 5/2005 | Conner et al. | ............... | 715/509 |
| 6,948,132 B2 * | 9/2005 | Bennett et al. | ............... | 715/760 |
| 7,013,310 B2 * | 3/2006 | Messing et al. | ............... | 707/104.1 |
| 7,013,340 B1 * | 3/2006 | Burd et al. | ............... | 709/229 |
| 2002/0052893 A1 * | 5/2002 | Grobler et al. | ............... | 707/509 |
| 2002/0078102 A1 * | 6/2002 | Dutta | ............... | 707/526 |
| 2002/0103832 A1 * | 8/2002 | Howarth | ............... | 707/526 |
| 2003/0165263 A1 * | 9/2003 | Hamer et al. | ............... | 382/133 |
| 2004/0148576 A1 * | 7/2004 | Matveyenko et al. | ............... | 715/530 |
| 2004/0216038 A1 * | 10/2004 | Liu et al. | ............... | 715/509 |
| 2005/0044497 A1 * | 2/2005 | Kotler et al. | ............... | 715/538 |
| 2005/0125377 A1 * | 6/2005 | Kotler et al. | ............... | 707/1 |
| 2005/0203882 A1 * | 9/2005 | Godley | ............... | 707/3 |
| 2005/0251737 A1 * | 11/2005 | Kobayashi et al. | ............... | 715/513 |
| 2005/0251742 A1 * | 11/2005 | Mogilevsky et al. | ............... | 715/521 |
| 2006/0041834 A1 * | 2/2006 | Chen et al. | ............... | 715/509 |
| 2007/0198911 A1 * | 8/2007 | Nilakantan et al. | ............... | 715/509 |

OTHER PUBLICATIONS

Hurst, A Constraint-based Approach to Table Structure Derivation, IEEE 2003, pp. 1-5.*

* cited by examiner

*Primary Examiner*—Cong-Lac Huynh
(74) *Attorney, Agent, or Firm*—Fulbright & Jaworski LLP

(57) ABSTRACT

A system and method is described for reconstituting a tag-delimited table structure into a file editable by a graphics editing application, the tag-delimited table structure defining an assembly of visible content, the method comprising parsing the tag-delimited table structure into a plurality of cells, generating a slice region within the file of the graphics editing application corresponding to each of said plurality of cells, calculating a cell boundary for each of the plurality of cells, setting a slice boundary according to the calculated cell boundary, and assembling the visible content into the associated slice regions in the file.

28 Claims, 5 Drawing Sheets

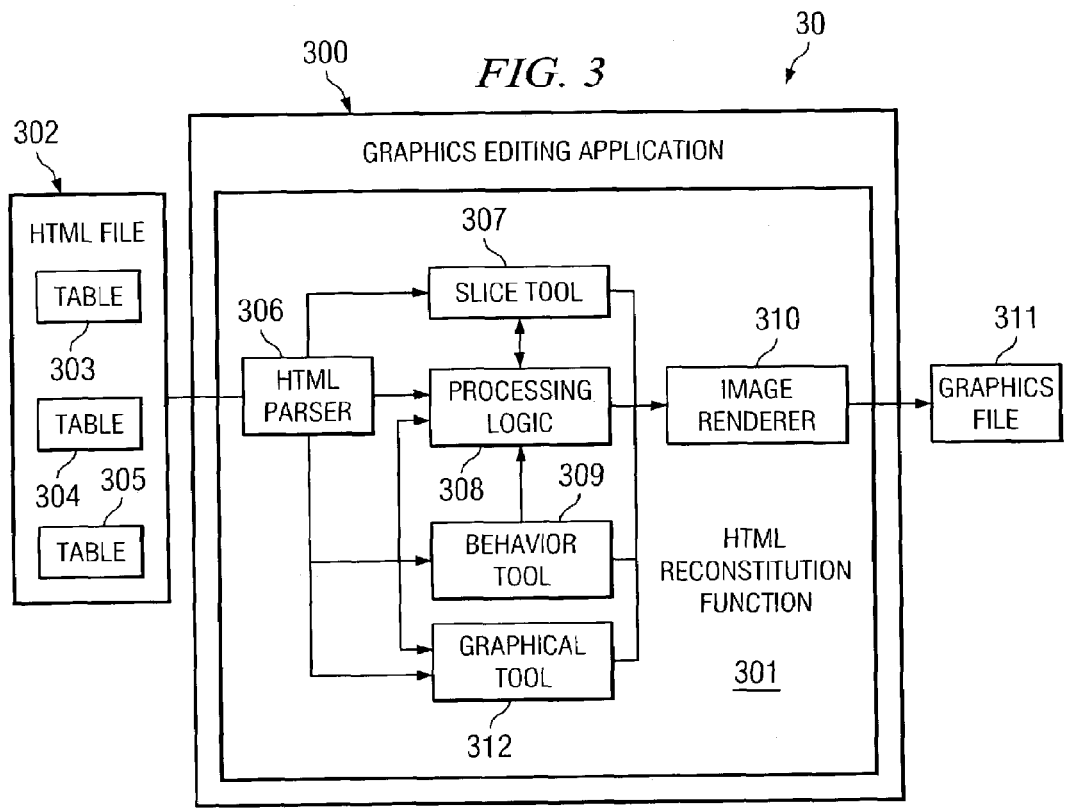
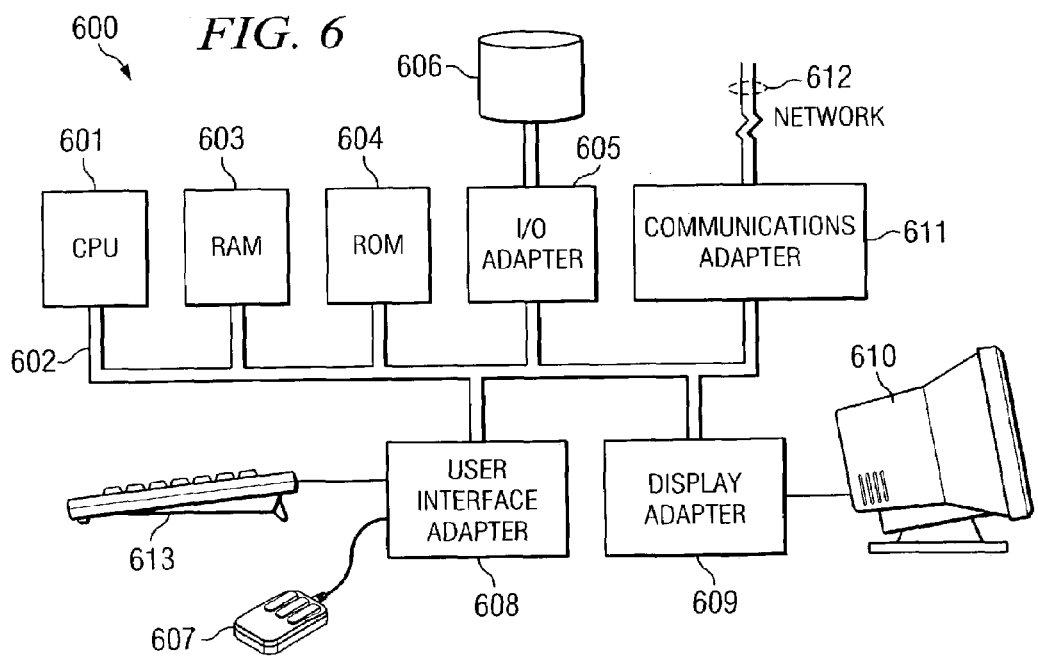

RECONSTITUTE TAG-DELIMITED TABLES IN A GRAPHICS EDITING APPLICATION

TECHNICAL FIELD

This present invention relates to graphics editing software and, more specifically, to editing Web page graphics.

BACKGROUND OF THE INVENTION

Web sites are typically comprised of a combination of visible content and associated code. Web design typically involves a graphics artist designing the graphics and general layout of the Web pages followed by the Web designer slicing up these graphics into different areas and then assigning functionality or logic, such as behaviors, links, rollovers, code, script, or the like, to the different graphic elements corresponding to each sliced area. These sliced graphic elements are then assembled into individual cells of a Hypertext Markup Language (HTML) table to be displayed as the Web page on a Web browser.

FIG. 1 is an illustration of Web page 11 displayed on Web browser 10 at Uniform Resource Locator (URL) 100. Web page 11 includes graphics areas 101 and 107, and other functional areas such as logon form 106 and interactive buttons 102-105. A problem arises when an edit or change to the Web page becomes desirable. The designers tasked with updating the Web page must typically retrieve the Web page and bring it into an image editing application, such as MACROMEDIA's FIREWORS™, MACROMEDIA's FREEHAND™, ADOBE's PHOTOSHOP™, and the like. However, once the Web functionality or logic has been applied to the graphics of the Web page, those graphics and images have been sliced into many individual image files, with some images hidden or viewable only on certain events (i.e., rollovers, frame swaps, and the like). Any graphical changes may need to be applied to many of the sliced graphics and any updates to the code, logic, or functionality may also need to be associated with the sliced elements that make up the Web page.

A Web designer tasked with modifying graphics incorporated into an existing Web page may usually obtain access to the original Web page content by downloading it via File Transport Protocol (FTP) or the like. After loading the Web page content into an editing application, the Web designer manually attempts to find and recombine all of the graphics or images for this particular page. A common method to assist this process includes opening the source code, such as the actual HTML file, in a plain text editor to use the image references in the source code to determine the file names of all the images. Once each of the graphics or images have been opened in the image editor, the designer manually positions the pieces attempting to reassemble the Web page like a jigsaw puzzle. The designer then attempts to figure out the functionality of the different graphics or images and determines which ones are hidden or used in rollovers or the like. Any changes are then made to the re-assembled and hidden content.

FIG. 2 is an illustration showing assembly of visible content 20 with the many graphics and images that comprise Web page 11 (FIG. 1). As is shown, there are many graphics and images, some of which cannot even be seen in the complete Web page 11 of FIG. 1, because they only show up with a button rollover or other such event. For example, home button 102 (FIG. 1) comprises three graphical images, buttons 202-204. Button 202 represents the initial button state, button 203 represents the rollover state of home button 102 (FIG. 1), and button 204 represents the depressed button state. Similarly, buttons 103-105 (FIG. 1) have three different state buttons in buttons 205-213. Each of pieces 200-217 are retrieved from the cells of an HTML table making up Web page 11 (FIG. 1). The designer would open each image or slice region of Web page 11 (FIG. 1) onto a graphical editing application, re-assemble the slice regions into a cohesive graphic, modify the graphic, and then re-slice and save the pieces into the modified Web page. In order for the modified Web page to correctly display when uploaded to the Web server, each image and graphic needs to be reassembled exactly bit for bit.

The modification process includes collecting the individual graphic slice regions from the Web page, assembling those bits and pieces for modification in the image editing application, modifying the re-assembled and associated graphics, and then re-slicing and saving the pieces for use in the modified Web page. This painstakingly detailed process generally takes a long time which translates to extensive costs for Web page modification. Frequently, because of the complexity and detail of the modification process, designers may redesign Web pages from scratch to avoid this long and expensive process.

BRIEF SUMMARY OF THE INVENTION

In order to overcome this complexity, a system and method to reconstitute image slices from HTML table structures into an image editing environment has been devised. By automatically reading the HTML table definitions, all of the individual graphics files in that HTML table can automatically be reassembled into a single editable graphics file. Other associated graphics, such as the button states may also be brought into the imaging application in a manner to facilitate editing the objects in place.

Representative embodiments of the present invention provide for a method for reconstituting a tag-delimited table structure into a file editable by a graphics editing application, the tag-delimited table structure defining an assembly of visible content, the method comprising parsing the tag-delimited table structure into a plurality of cells, generating a slice region within the file of the graphics editing application corresponding to each of said plurality of cells, calculating a cell boundary for each of the plurality of cells, setting a slice boundary according to the calculated cell boundary, and assembling the visible content into the associated slice regions in the file.

Additional representative embodiments of the present invention provide a graphics design tool comprising a tag-based language parser for parsing a tag-defined table into at least one cell, the tag-defined table defining a compilation of visual information, a slice tool for automatically creating a slice region on an electronic canvas for each of the at least one cell, processing logic for determining a size for each of the at least one cell, the slice tool resizing the slice region according to the size for each of the at least one cell, and an image renderer for rendering image data into the slice regions on the electronic canvas according to the compilation of visual information.

Further representative embodiments of the present invention provide a method for reconstructing an editable graphics file from a Web page HTML table comprising parsing the HTML table into a plurality of table cells, generating a slice region on the editable graphics file corresponding to each of the plurality of table cells, determining a size of the plurality of table cells, sizing the slice regions according to the corresponding ones of the plurality of table cells, and rendering graphics from the Web page onto associated ones of the slice regions on the editable graphics file.

The foregoing has outlined rather broadly the features and technical advantages of the present invention in order that the detailed description of the invention that follows may be better understood. Additional features and advantages of the invention will be described hereinafter which form the subject of the claims of the invention. It should be appreciated by those skilled in the art that the conception and specific embodiment disclosed may be readily utilized as a basis for modifying or designing other structures for carrying out the same purposes of the present invention. It should also be realized by those skilled in the art that such equivalent constructions do not depart from the spirit and scope of the invention as set forth in the appended claims. The novel features which are believed to be characteristic of the invention, both as to its organization and method of operation, together with further objects and advantages will be better understood from the following description when considered in connection with the accompanying figures. It is to be expressly understood, however, that each of the figures is provided for the purpose of illustration and description only and is not intended as a definition of the limits of the present invention.

BRIEF DESCRIPTION OF THE DRAWINGS

For a more complete understanding of the present invention, reference is now made to the following descriptions taken in conjunction with the accompanying drawing, in which:

FIG. 3 is a block diagram illustrating a HTML editing system including a graphics editing application provided with an HTML reconstitution function configured according to the teachings of the present invention;

FIG. 6 illustrates a computer system adapted to use the present invention with a Central Processing Unit (CPU) coupled to a system bus.

DETAILED DESCRIPTION OF THE INVENTION

Figure 1:
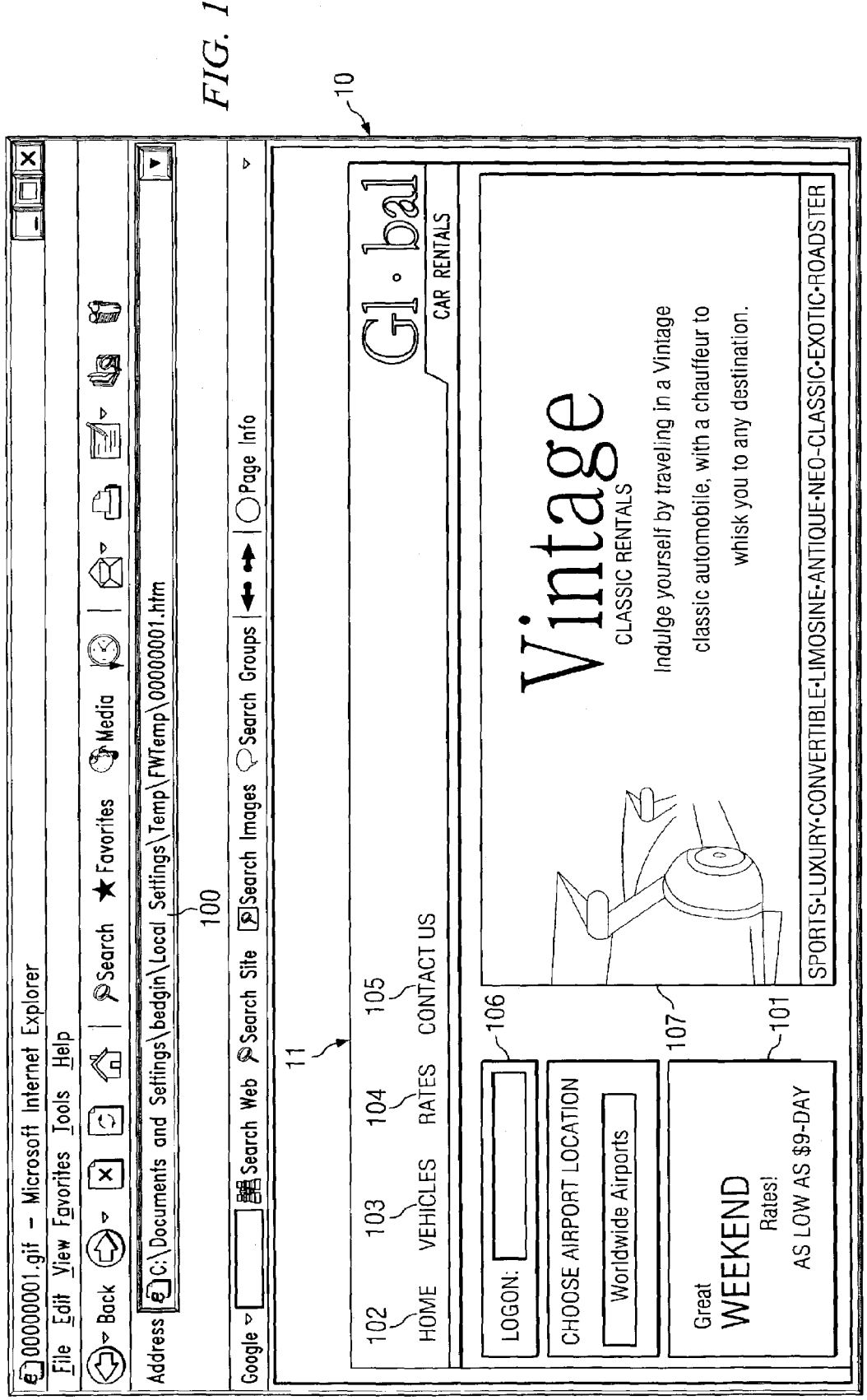
FIG. 1 is an illustration of a Web page displayed on a Web browser at a Uniform Resource Locator (URL)

FIG. 3 is a block diagram illustrating HTML editing system 30 including graphics editing application 300 provided with HTML reconstitution function 301 configured according to the teachings of the present invention. A Web developer tasked with modifying an existing Web page begins by identifying HTML file 302 defining the targeted Web page. HTML file 302 may include HTML tables 303-305 that define the assembly of visual content displayed on the Web page. Once HTML file 302 has been downloaded, the Web developer, using graphics editing application 300, executes HTML reconstitution function 301 on HTML file 302.

HTML parser 306 begins parsing the HTML of HTML file 302. HTML parsers are well known in the art. As an HTML table, such as table 303, is parsed, the number of cells in table 303 is determined. Slice tool 307 generates an image slice for each of the cells from table 303. In order to reproduce the Web page in its existing form, processing logic 308 determines the actual size of each cell. Processing logic 308 may use several different techniques for determining the cell size. In some HTML tables, such as those tables generated by advanced HTML editors, such as MACROMEDIA's DREAMWEAVER MX™, the height and width of the slice region/cell size is included in the HTML table. Therefore, processing logic 308 simply reads the height and width from an HTML table cell. Alternative methods that may be used include temporarily rendering the individual slice region to manually measure the size, or even assigning a default size to the slice region (e.g., 25×25 pixels). Once the size of the slice region is determined, slice tool 307 sizes the created slice region according to processing logic 308's determinations. The slice regions are rendered onto graphics file 311 by image renderer 310 in the appropriate size resulting in an outline of slice regions that closely match the Web page image sizes.

The parsed table of HTML file 302 is analyzed again to determine if any functionality, such as behaviors, JavaScript, hot spots, image maps, or the like are associated with any of the slice regions. Depending on the origination of these functional spots, graphics editing application 300 may be capable of understanding the functions for these pop-up menus, button rollovers, and the like and will be able to convert those specific behaviors to be exported with exactly the same functionality as demonstrated in the original Web page. In other instances, when graphics editing application 300 does not recognize the specific functionality associated with the selected slice regions, an arbitrary function may be assigned or, in some embodiments, the code from the original Web page may be preserved intact, without recognizing the function or origination of the code, and then re-assigned as a "black box" type of functionality to the associated slice region on export.

In alternative embodiments of the present invention, graphical tool 312 may be used to create a series of rectangles based on the size and number of cells that HTML parser 306 determines are within the parsed table, such as table 303. By creating the rectangles and rendering the rectangles onto graphics file 311 with image renderer 310, the size of the reconstituted table is verified prior to inserting the slice regions over the rectangles created by slice tool 307.

In addition to establishing graphics file 311 with slice regions and associated functionality as determined from the original Web page, HTML reconstitution function 301 also retrieves and inserts the images or visual information from the Web page onto graphics file 311. In one embodiment of the present invention, the visual content initially shown is for the first state without any mouse interaction, or any user interaction or functionality. The hidden or event-driven images or graphics are rendered onto different frames or layers of graphics file 311. By separating the different images onto different frames, the Web designer is able to work easily on many different pieces and slice regions of the original Web page, including those event-driven hidden pieces and slice regions. Any text or data that was associated with the cell/slice region of the HTML table in HTML file 302 is loaded into the associated slice region. Therefore, when exported, the modified Web page will maintain its functionality.

Some HTML editors, such as MACROMEDIA's DREAMWEAVER™, export HTML tables with spacer rows and columns to improve the table's aesthetics. In such circumstances, if such a table with spacer rows and columns is processed by HTML reconstitution function 301, it results in a table exactly one pixel too big in both dimensions. Processing logic 308 includes logic that analyzes tables 303-305 of HTML file 302 to deduce whether any of the parsed tables includes row and column spacers or not. If processing logic 308 deduces that the parsed table does include spacers, HTML reconstitution function 301 is notified to have image renderer 310 remove the extra spacers. In cases where processing logic 308 cannot correctly deduce whether a particular parsed table includes spacers, an option in graphics editing application 300 may allow the developer to manually remove the spacers, or reinsert some graphics that were inadvertently removed.

Figure 2:
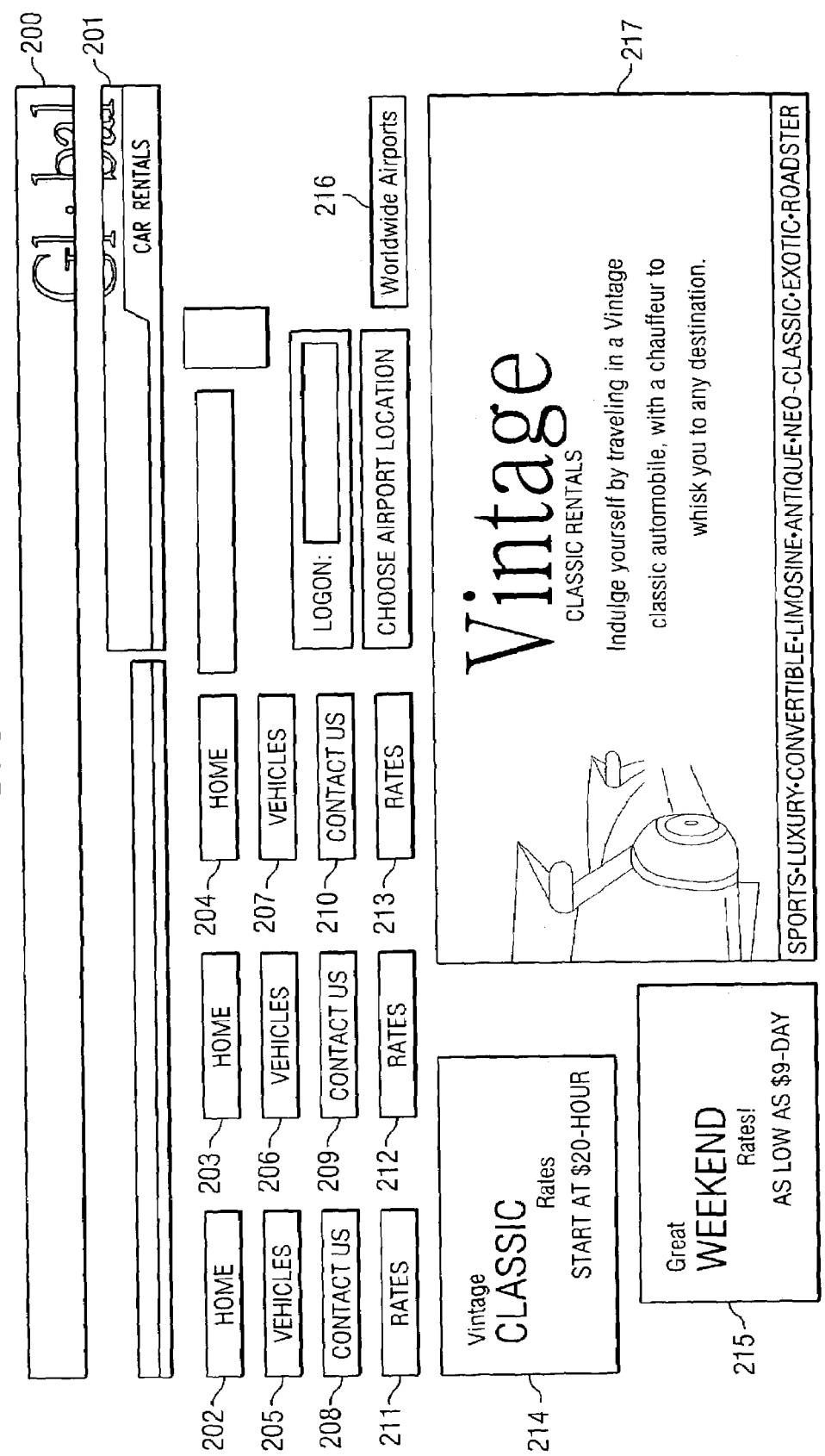
FIG. 2 is an illustration showing the assembly of visible content with the many graphics and images that comprise the Web page shown in FIG. 1.

Referring again to FIG. 1, the HTML file that defines Web page 11 may be processed by HTML reconstitution function 301 (FIG. 3) of graphics editing application 300. A table within the HTML file may hold the bits and pieces of Web page 11 (FIG. 1), as shown in elements 200-217 of FIG. 2. By processing through HTML reconstitution function 301 (FIG. 3), graphics file 311 may be rendered by image renderer 310 to produce a visual representation of the Web page, but in an editable format.

Figure 4:
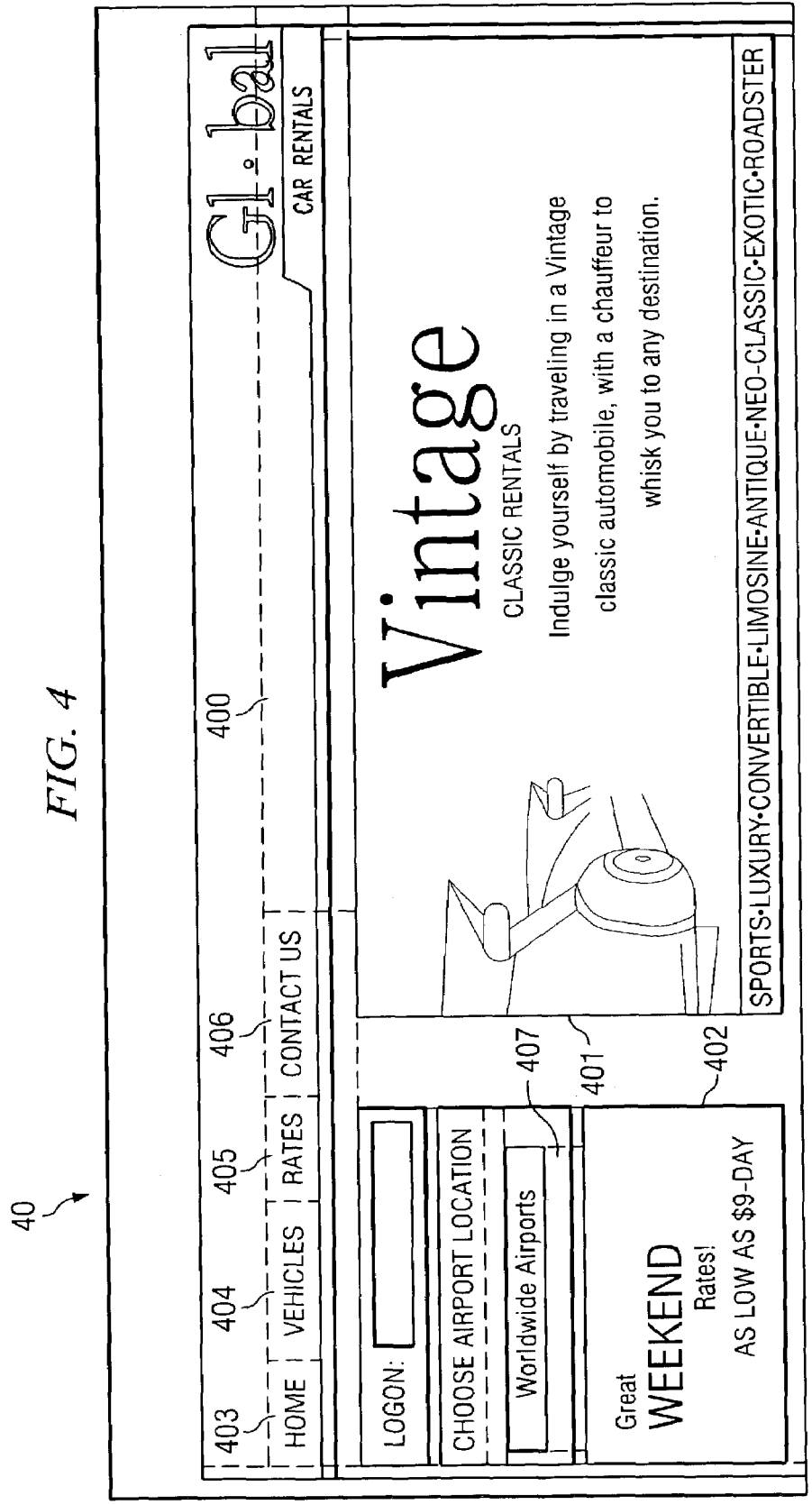
FIG. 4 is an illustration of graphics file 40 that includes visible slice guides presenting the assembly of the bits and pieces of the visual data or information.

FIG. 4 is an illustration of graphics file 40 that includes visible slice guides presenting the assembly of the bits and pieces of the visual data or information. Graphics file 40 illustrate slice guides, such as slice guides 400-402. File 40 also illustrates the normal state for each of buttons 403-407. When opened in an image editing platform, the multiple frames will be accessible in order to modify or manipulate the hidden state or event-driven images.

Figure 5:
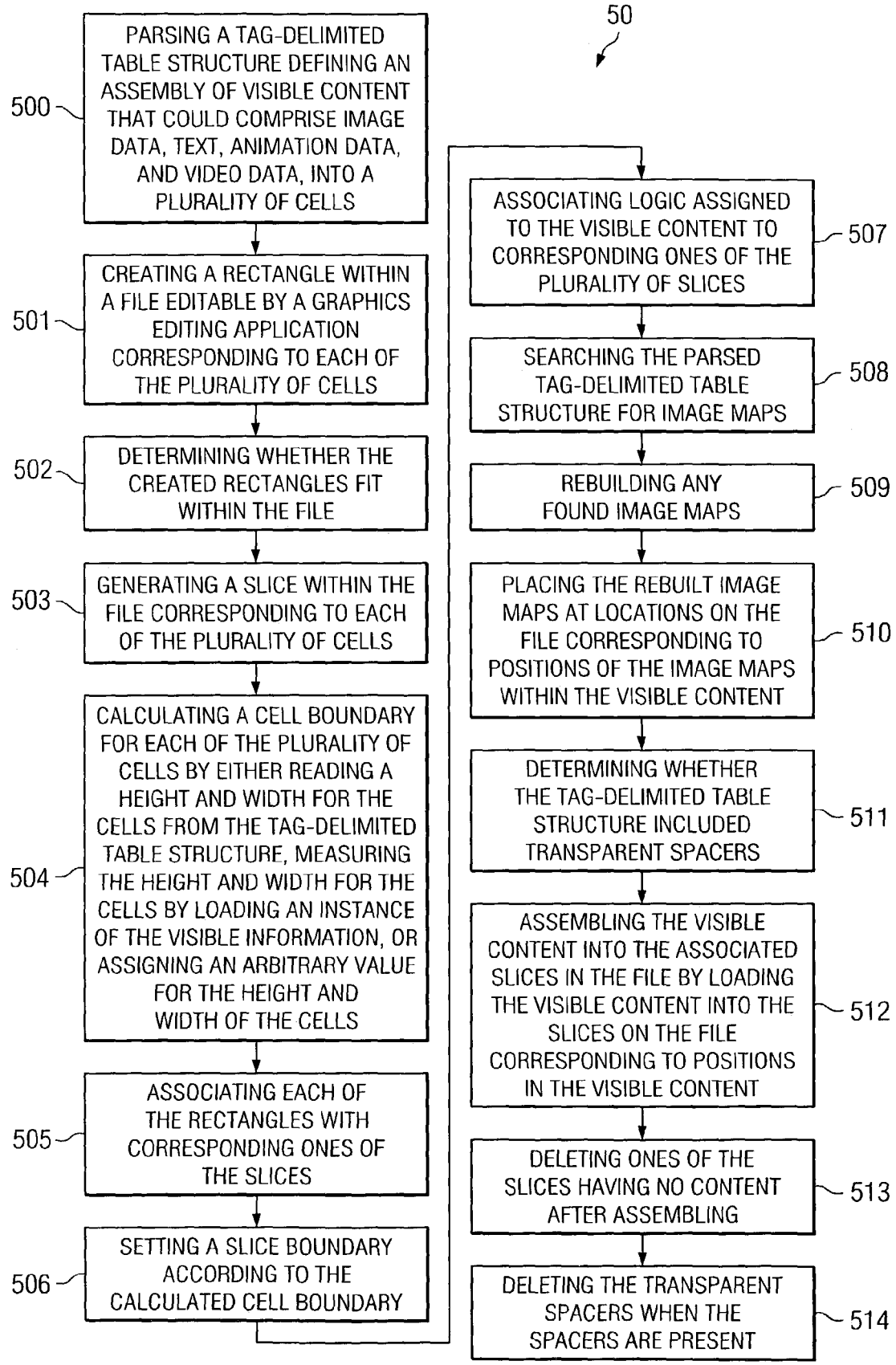
FIG. 5 is a flowchart illustrating representative steps 50 practiced in implementing various embodiments of the present invention.

FIG. 5 is a flowchart illustrating representative steps 50 practiced in implementing various embodiments of the present invention. In step 500, a tag-delimited table structure defining an assembly of visible content that could comprise image data, text, animation data, and video data, is parsed into a plurality of cells. In step 501, a rectangle is created within a file editable by a graphics editing application corresponding to each of the plurality of cells. A determination is made, in step 502, whether the created rectangles fit within the file. In step 503, a slice region is generated within the file corresponding to each of the plurality of cells. A cell boundary is calculated for each of the plurality of cells in step 504 by either reading a height and width for the cells from the tag-delimited table structure, measuring the height and width for the cells by loading an instance of the visible information, or assigning an arbitrary value for the height and width of the cells. In step 505, each of the rectangles is associated with corresponding ones of the slice regions. In step 506, a slice boundary is set according to the calculated cell boundary. In step 507, logic assigned to the visible content is associated with corresponding ones of the plurality of slice regions. The parsed tag-delimited table structure is searched in step 508 for image maps. In step 508, any found image maps are rebuilt. The rebuilt image maps are placed at locations on the file in step 510 corresponding to positions of the image maps within the visible content. In step 511 a determination is made whether the tag-delimited table structure included transparent, spacers. In step 512, the visible content is assembled into the associated slice regions in the file by loading the visible content into the slice regions on the file corresponding to positions in the visible content. Thereafter, in step 513, ones of the slice regions having no content are deleted after assembly. If transparent spacers were detected, the spacers are then deleted in step 514.

It should be noted that an HTML table is one example of a tag-delimited table. While many of the previously described embodiments of the present invention have been described using HTML tables, other tag-based tables may also benefit from the teachings of the present invention.

When implemented in software, the elements of the present invention are essentially the code segments to perform the necessary tasks. The program or code segments can be stored in a computer readable medium or transmitted by a computer data signal embodied in a carrier wave, or a signal modulated by a carrier, over a transmission medium. The "computer readable medium" may include any medium that can store or transfer information. Examples of the computer readable medium include an electronic circuit, a semiconductor memory device, a ROM, a flash memory, an erasable ROM (EROM), a floppy diskette, a compact disk CD-ROM, an optical disk, a hard disk, a fiber optic medium, a radio frequency (RF) link, etc. The computer data signal may include any signal that can propagate over a transmission medium such as electronic network channels, optical fibers, air, electromagnetic, RF links, and the like. The code segments may be downloaded via computer networks such as the Internet, Intranet, and the like.

FIG. 6 illustrates computer system 600 adapted to use the present invention. Central processing unit (CPU) 601 is coupled to system bus 602. The CPU 601 may be any general purpose CPU, such as an INTERNATIONAL BUSINESS MACHINE (IBM) POWERPC™, INTEL™ PENTIUM™-type processor, or the like. However, the present invention is not restricted by the architecture of CPU 601 as long as CPU 601 supports the inventive operations as described herein. Bus 602 is coupled to random access memory (RAM) 603, which may be SRAM, DRAM, or SDRAM. ROM 604 is also coupled to bus 602, which may be PROM, EPROM, EEPROM, Flash ROM, or the like. RAM 603 and ROM 604 hold user and system data and programs as is well known in the art.

Bus 602 is also coupled to input/output (I/O) controller card 605, communications adapter card 611, user interface card 608, and display card 609. The I/O adapter card 605 connects to storage devices 606, such as one or more of a hard drive, a CD drive, a floppy disk drive, a tape drive, to the computer system. The I/O adapter 605 would also allow the system to print paper copies of information, such as documents, photographs, articles, etc. Such output may be produced by a printer (e.g. dot matrix, laser, and the like), a fax machine, a copy machine, or the like. Communications card 611 is adapted to couple the computer system 600 to a network 612, which may be one or more of a telephone network, a local (LAN) and/or a wide-area (WAN) network, an Ethernet network, and/or the Internet network. User interface card 608 couples user input devices, such as keyboard 613, pointing device 607, to the computer system 600. The display card 609 is driven by CPU 601 to control the display on display device 610.

Although the present invention and its advantages have been described in detail, it should be understood that various changes, substitutions and alterations can be made herein without departing from the spirit and scope of the invention as defined by the appended claims. Moreover, the scope of the present application is not intended to be limited to the particular embodiments of the process, machine, manufacture, composition of matter, means, methods and steps described in the specification. As one of ordinary skill in the art will readily appreciate from the disclosure of the present invention, processes, machines, manufacture, compositions of matter, means, methods, or steps, presently existing or later to be developed that perform substantially the same function or achieve substantially the same result as the corresponding embodiments described herein may be utilized according to the present invention. Accordingly, the appended claims are intended to include within their scope such processes, machines, manufacture, compositions of matter, means, methods, or steps.

What is claimed is:

1. A method comprising:
   parsing a tag-delimited table structure into a plurality of cells, said tag-delimited table structure defining an assembly of graphical images displayed on a web page;
   generating an editable file in a graphics editing application, said editable file having a plurality of slice regions corresponding said plurality of cells;
   setting slice boundaries for each of said plurality of slice regions to match cell boundaries of corresponding ones of each of said plurality of cells;
   importing images of said assembly of graphical images into said graphics editing application; and
   reconstructing said assembly of graphical images within said editable file such that said plurality of slice regions comprise said images originally present in said corresponding ones of said plurality of cells.

2. The method of claim 1, further comprising:
   determining at least one functional aspect associated with a functional one of said plurality of cells; and
   applying said at least one functional aspect to one of said plurality of slice regions corresponding to said functional one of said plurality of cells.

3. The method of claim 2, further comprising:
   rendering one of said images comprised in said one of said plurality of slice regions in a separate layer of said editable file.

4. The method of claim 3, wherein said at least one of said images is an event-driven, hidden image.

5. The method of claim 1, further comprising:
   creating at least one rectangle within said editable file corresponding to each of said plurality of cells; and
   determining whether said created rectangles fit within said editable file prior to setting said slice boundaries.

6. The method of claim 1, wherein each of said plurality of sliced regions of said editable file has a same size as a corresponding one of said plurality of cells.

7. The method of claim 1, wherein setting said slice boundaries comprises temporarily rendering said slice regions in said editable file to allow a user to manually adjust said slice boundaries.

8. The method of claim 1, further comprising:
   searching said parsed tag-delimited table structure for image maps;
   rebuilding said image maps; and
   placing said rebuilt image maps at locations on said editable file corresponding to positions of said image maps within said assembly of graphical images.

9. The method of claim 1, further comprising:
   identifying at least one transparent spacer in said tag-delimited table structure; and
   removing said at least one transparent spacer from said editable file during said reconstructing step.

10. The method of claim 1, wherein at least one of said parsing, generating, setting, importing, and reconstructing is performed autonomously by said graphics editing application executing on a computer system.

11. The method of claim 1, further comprising executing said graphics design software application on a computer system to automatically perform at least portions of said parsing, generating, importing, and reconstructing.

12. A graphics design application comprising:
   a tag-based language parser for parsing a tag-delimited table into a plurality of cells, said tag-delimited table comprising a compilation of graphical images of a web page;
   processing logic for determining a size of each of said plurality of cells;
   a slice tool for automatically creating a plurality of slice regions on an electronic canvas of a graphics design application, said plurality of slice regions corresponding to said plurality of cells;
   a slice tool for resizing each of said plurality of slice regions to match sizes of corresponding ones of said plurality of cells; and
   an image renderer for rendering images within each of said plurality of slice regions to reconstruct said compilation of graphical images from said web page in said electronic canvas.

13. The graphics design application of claim 12, further comprising:
   a behavior tool for determining at least one behavioral aspect associated with a functional of said plurality of cells and applying said at least one behavioral aspect to one of said plurality of slice regions corresponding to said functional one of said plurality of cells.

14. The graphics design application of claim 13, said image renderer being operable to render an individual image originally present in said one of said plurality of cells within said one of said plurality of slice regions in a separate layer of said electronic canvas.

15. The graphics design application of claim 14, wherein said individual image is an event-driven, hidden image.

16. The graphics design application of claim 12, further comprising:
   a graphical tool for creating a geometric shape representative of said at least one of said plurality of cells and determining whether said geometric shape fits within said electronic canvas prior to said slice tool automatically creating said plurality of slice regions.

17. The graphics design application of claim 12, said image renderer temporarily rendering portions of said compilation of graphical images ill said electronic canvas to allow a user to manually adjust said slice regions' boundaries.

18. The graphics design application of claim 12, said processing logic:
   searching said parsed tag-delimited table for image maps;
   rebuilding said image maps; and
   placing said rebuilt image maps at locations on said electronic canvas corresponding to positions of said image maps within said compilation of graphical images.

19. The graphics design application of claim 12, said processing logic identifying at least one transparent spacer in said tag-delimited table and removing said at least one transparent spacer during a rendering step.

20. A computer program product having a computer readable storage medium with computer program logic recorded thereon, said computer program product comprising:
   code for parsing a Hypertext Markup Language (HTML) table into a plurality of cells, said HTML table defining an assembly of graphical images displayed on a web page;

code for generating an editable file in a graphics editing application, said editable file having a plurality of slice regions corresponding to said plurality of cells;

code for setting slice boundaries for each of said plurality of slice regions to match cell boundaries of corresponding ones of each of said plurality of cells;

code for importing images of said assembly of graphical images into said graphics editing application; and code for reconstructing said assembly of graphical images within said editable file such that said plurality of slice regions comprise said images originally present in said corresponding ones of said plurality of cells.

21. The computer program product of claim 20, further comprising:

code for determining at least one functional aspect associated with a functional of said plurality of cells; and code for applying said at least one functional aspect to one of said plurality of slice regions corresponding to said functional one of said plurality of cells.

22. The computer program product of claim 21, further comprising:

code for rendering one of said images comprised in said one of said plurality of slice regions in a separate layer of said editable file.

23. The computer program product of claim 22, wherein said at least one of said images is an event-driven, hidden image.

24. The computer program product of claim 20, further comprising:

code for creating at least one rectangle within said editable file corresponding to each of said plurality of cells; and code for determining whether said created rectangles fit within said editable file prior to setting said slice boundaries.

25. The computer program product of claim 20, wherein each of said plurality of sliced regions of said editable file has a same size as a corresponding one of said plurality of cells.

26. The computer program product of claim 20, wherein said code for setting said slice boundaries comprises code for temporarily rendering said slice regions in said editable file to allow a user to manually adjust said slice boundaries.

27. The computer program product of claim 20, further comprising:

code for searching said parsed tag-delimited table structure for image maps;

code for rebuilding said image maps; and code for placing said rebuilt image maps at locations on said editable file corresponding to positions of said image maps within said assembly of graphical images.

28. The computer program product of claim 20, further comprising:

code for identifying at least one transparent spacer in said tag-delimited table structure; and code for removing said at least one transparent spacer from said editable file during said reconstructing step.

* * * * *